United States Patent
Wang et al.

(10) Patent No.: US 9,881,577 B2
(45) Date of Patent: Jan. 30, 2018

(54) TOUCH SUBSTRATE, TOUCH DISPLAY PANEL AND DRIVING METHOD THEREOF, TOUCH DISPLAY DEVICE

(71) Applicants: BOE TECHNOLOGY GROUP CO., LTD., Beijing (CN); HEFEI XINSHENG OPTOELECTRONICS TECHNOLOGY CO.,LTD., Hefei, Anhui (CN)

(72) Inventors: Qingpu Wang, Beijing (CN); Ming Hu, Beijing (CN); Lei Zhang, Beijing (CN); Jun Li, Beijing (CN); Ting Zeng, Beijing (CN); Xiaodong Xie, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/160,227

(22) Filed: May 20, 2016

(65) Prior Publication Data

US 2017/0083142 A1 Mar. 23, 2017

(30) Foreign Application Priority Data

Sep. 17, 2015 (CN) .......................... 2015 1 0596065

(51) Int. Cl.
*G06F 3/041* (2006.01)
*G09G 3/36* (2006.01)
(Continued)

(52) U.S. Cl.
CPC .......... *G09G 3/3677* (2013.01); *G06F 3/044* (2013.01); *G06F 3/0414* (2013.01);
(Continued)

(58) Field of Classification Search
CPC .......... G06F 3/041–3/047; G06F 2203/04102; G06F 2203/04103; G06F 2203/04105;
(Continued)

(56) References Cited

U.S. PATENT DOCUMENTS

2007/0229464 A1* 10/2007 Hotelling .............. G06F 3/0414
345/173
2007/0236466 A1* 10/2007 Hotelling ................ G06F 3/044
345/173
(Continued)

*Primary Examiner* — Roberto Flores
(74) *Attorney, Agent, or Firm* — Nath, Goldberg & Meyer; Joshua B. Goldberg

(57) ABSTRACT

The present invention provides a touch substrate comprising a plurality of capacitive touch driving electrodes extending in a row direction, a plurality of capacitive touch sensing electrodes extending in a column direction, a plurality of first pressure sensitive electrodes extending in the row direction and a plurality of second pressure sensitive electrodes extending in the column direction, the capacitive touch driving electrode and the capacitive touch sensing electrode are insulated from each other, the first pressure sensitive electrode is insulated from the capacitive touch sensing electrode and the capacitive touch driving electrode, the second pressure sensitive electrode is insulated from the capacitive touch sensing electrode and the capacitive touch driving electrode, when the touch substrate is touched, a voltage corresponding to a pressure at a touch position is generated between the first pressure sensitive electrode and the second pressure sensitive electrode corresponding to the touch position.

18 Claims, 3 Drawing Sheets

(51) Int. Cl.
*G06F 3/044* (2006.01)
*G09G 3/3266* (2016.01)

(52) U.S. Cl.
CPC . *G09G 3/3266* (2013.01); *G06F 2203/04103* (2013.01); *G06F 2203/04106* (2013.01); *G06F 2203/04111* (2013.01)

(58) Field of Classification Search
CPC .......... G06F 2203/04106; G06F 1/162; H04M 1/0268
USPC .................................................. 345/173–179
See application file for complete search history.

(56) References Cited

U.S. PATENT DOCUMENTS

| | | | | |
|---|---|---|---|---|
| 2008/0075930 A1* | 3/2008 | Kornbluh | .................. | B64C 3/48 428/189 |
| 2010/0013785 A1* | 1/2010 | Murai | ..................... | G06F 3/047 345/173 |
| 2010/0128002 A1* | 5/2010 | Stacy | ....................... | G06F 3/016 345/174 |
| 2010/0253651 A1* | 10/2010 | Day | ........................ | G06F 3/044 345/175 |
| 2011/0069036 A1* | 3/2011 | Anno | .................. | G06F 3/03545 345/174 |
| 2011/0141052 A1* | 6/2011 | Bernstein | ................ | G06F 3/016 345/174 |
| 2012/0092350 A1* | 4/2012 | Ganapathi | .......... | G02B 26/0833 345/501 |
| 2012/0127112 A1* | 5/2012 | Lu | ........................... | G06F 3/044 345/174 |
| 2012/0327027 A1* | 12/2012 | Chang | ................... | G06F 3/0416 345/174 |
| 2013/0033450 A1* | 2/2013 | Coulson | .................. | G06F 3/044 345/174 |
| 2013/0278542 A1* | 10/2013 | Stephanou | ............ | G06F 3/0414 345/174 |
| 2014/0008203 A1* | 1/2014 | Nathan | ................ | H03K 17/962 200/600 |
| 2014/0020484 A1* | 1/2014 | Shaw | ...................... | G01L 1/146 73/862.625 |
| 2014/0022177 A1* | 1/2014 | Shaw | ...................... | G06F 1/1669 345/168 |
| 2014/0062933 A1* | 3/2014 | Coulson | .................. | G06F 3/044 345/174 |
| 2014/0062934 A1* | 3/2014 | Coulson | .................. | G06F 3/044 345/174 |
| 2014/0085253 A1* | 3/2014 | Leung | ................... | G06F 3/0414 345/174 |
| 2014/0267128 A1* | 9/2014 | Bulea | ...................... | G06F 3/044 345/174 |
| 2015/0370356 A1* | 12/2015 | Hwang | .................. | G06F 3/041 345/173 |
| 2016/0103545 A1* | 4/2016 | Filiz | ......................... | G01L 1/18 345/174 |
| 2016/0147352 A1* | 5/2016 | Filiz | ......................... | G01L 1/18 345/173 |
| 2016/0195955 A1* | 7/2016 | Picciotto | ................ | G06F 3/044 345/174 |
| 2017/0068372 A1* | 3/2017 | Kim | ...................... | G06F 3/0412 |

\* cited by examiner

A-A

TOUCH SUBSTRATE, TOUCH DISPLAY PANEL AND DRIVING METHOD THEREOF, TOUCH DISPLAY DEVICE

FIELD OF THE INVENTION

The present invention relates to the field of display technology, and specifically relates to a touch substrate, a touch display panel comprising the touch substrate, a driving method of the touch display panel and a touch display device comprising the touch display panel.

BACKGROUND OF THE INVENTION

Currently, most widely used touch panels are capacitive touch panels. The capacitive touch panel supports multi-touch function, has high touch sensitivity, high transmittance and low power consumption, and the touch surface thereof has high hardness and does not need to be pressed, thus the capacitive touch panel has a long service life. However, the capacitive touch panel can only sense touch by a conductor, and cannot sense pressure of touch.

Therefore, how to realize pressure sensing while ensuring touch sensitivity becomes a technical problem to be solved urgently in the field.

SUMMARY OF THE INVENTION

An object of the present invention is to provide a touch substrate, a touch display panel comprising the touch substrate, a driving method of the touch display panel and a touch display device comprising the touch display panel, which can realize pressure sensing while ensuring touch sensitivity, so that users can obtain better experiences.

In order to achieve above object, the present invention provides a touch substrate, which comprises a plurality of capacitive touch driving electrodes extending in a row direction and a plurality of capacitive touch sensing electrodes extending in a column direction, the capacitive touch driving electrode and the capacitive touch sensing electrode being insulated and spaced from each other, wherein the touch substrate further comprises a plurality of first pressure sensitive electrodes extending in the row direction and a plurality of second pressure sensitive electrodes extending in the column direction, the first pressure sensitive electrode being insulated and spaced from the capacitive touch sensing electrode and the capacitive touch driving electrode, the second pressure sensitive electrode being insulated and spaced from the capacitive touch sensing electrode and the capacitive touch driving electrode, and when the touch substrate is touched, a voltage corresponding to a pressure at a touch position can be generated between the first pressure sensitive electrode and the second pressure sensitive electrode corresponding to the touch position.

Preferably, at least one capacitive touch driving electrode is provided between any two adjacent first pressure sensitive electrodes, and at least one capacitive touch sensing electrode is provided between any two adjacent second pressure sensitive electrodes.

Preferably, the first pressure sensitive electrode and the capacitive touch driving electrode are alternately arranged, and the second pressure sensitive electrode and the capacitive touch sensing electrode are alternately arranged.

Preferably, the first pressure sensitive electrode comprises a first electrode strip and a first pressure sensing strip, the second pressure sensitive electrode comprises a second electrode strip and a second pressure sensing strip, both the first pressure sensing strip and the second pressure sensing strip are formed of a transparent material with piezoelectric effect, and the first pressure sensing strip and the second pressure sensing strip are provided intersecting with each other and in a same layer; and the first electrode strip is provided above the first pressure sensing strip, and the second electrode strip is provided below the second pressure sensing strip; or, the first electrode strip is provided below the first pressure sensing strip, and the second electrode strip is provided above the second pressure sensing strip.

Preferably, the touch substrate further comprises a processing module, a first piezoelectric transmission line and a second piezoelectric transmission line, the first piezoelectric transmission line being connected between the first electrode strip and the processing module, the second piezoelectric transmission line being connected between the second electrode strip and the processing module, wherein the processing module is configured to receive electrical signals from the first electrode strip and the second electrode strip, and determine the pressure at the touch position in accordance with the electrical signals from the first electrode strip and the second electrode strip.

Preferably, the touch substrate further comprises a touch driving transmission line and a touch sensing transmission line, the touch driving transmission line being connected between the capacitive touch driving electrode and the processing module, the touch sensing transmission line being connected between the capacitive touch sensing electrode and the processing module, wherein the processing module is capable of providing a touch driving signal to the capacitive touch driving electrodes successively, and detecting an electrical signal sensed by the capacitive touch sensing electrode.

Preferably, each of the capacitive touch sensing electrodes comprises a plurality of capacitive touch sensing electrode patches connected with each other successively, and each of the capacitive touch driving electrodes comprises a plurality of capacitive touch driving electrode patches connected with each other successively, and two capacitive touch driving electrode patches of the same capacitive touch driving electrode on both sides of the same second pressure sensitive electrode are bridged by a first bridging element, and the first bridging element is insulated and spaced from the second pressure sensitive electrode; and two capacitive touch sensing electrode patches of the same capacitive touch sensing electrode on both sides of the same first pressure sensitive electrode are bridged by a second bridging element, and the second bridging element is insulated and spaced from the first pressure sensitive electrode.

Preferably, a region defined by any two adjacent first pressure sensitive electrodes and any two adjacent second pressure sensitive electrodes is provided with two capacitive touch driving electrode patches and two capacitive touch sensing electrode patches therein, and the two capacitive touch sensing electrode patches are integrally formed, and the two capacitive touch driving electrode patches are bridged by a third bridging element insulated and spaced from the capacitive touch sensing electrode patches; or, the two capacitive touch driving electrode patches are integrally formed, and the two capacitive touch sensing electrode patches are bridged by a third bridging element insulated and spaced from the capacitive touch driving electrode patches.

Preferably, the capacitive touch driving electrode patches, the capacitive touch sensing electrode patches and the first electrode strip are formed of a same material, and the third bridging element and the second electrode strip are formed of a same material; or, the capacitive touch driving electrode patches, the capacitive touch sensing electrode patches and the second electrode strip are formed of a same material, and the third bridging element and the first electrode strip are formed of a same material.

Preferably, the first pressure sensing strip and the second pressure sensing strip are formed of a material including polylactic acid piezoelectric material or piezoelectric ceramic material.

Preferably, the touch substrate further comprises a transparent protective layer covering the capacitive touch sensing electrode, the capacitive touch driving electrode, the first pressure sensitive electrode and the second pressure sensitive electrode.

Correspondingly, the present invention also provides a touch display panel comprising a display substrate and the touch substrate of the present invention, the display substrate and the touch substrate are connected fixedly.

Correspondingly, the present invention also provides a touch display device comprising the touch display panel of the present invention.

Correspondingly, the present invention also provides a driving method of the touch display panel provided by the present invention, the driving method comprises steps of:

providing a touch driving signal to the capacitive touch driving electrode;

detecting a touch sensing signal from the capacitive touch sensing electrode, and determining a touch position in accordance with the touch sensing signal; and detecting a voltage between the first pressure sensitive electrode and the second pressure sensitive electrode, and determining a pressure at the touch position in accordance with the detected voltage.

In the present invention, the touch position is determined accurately in accordance with change of a sensing capacitance formed between the capacitive touch sensing electrode and the capacitive touch driving electrode, meanwhile, a voltage corresponding to the pressure at the touch position is generated between the first pressure sensitive electrode and the second pressure sensitive electrode corresponding to the touch position, so that pressure sensing is realized while ensuring touch sensitive. Thus, with the touch display panel or touch display device comprising the touch substrate, different operations can be performed in accordance with different voltages (i.e., different pressures), resulting in enhanced user's experiences.

BRIEF DESCRIPTION OF THE DRAWINGS

The drawings, as a part of the specification, are provided for further understanding of the present invention. The drawings and the following embodiments are used to explain the present invention but are not intended to limit the present invention. In the drawings.

Figure 1:
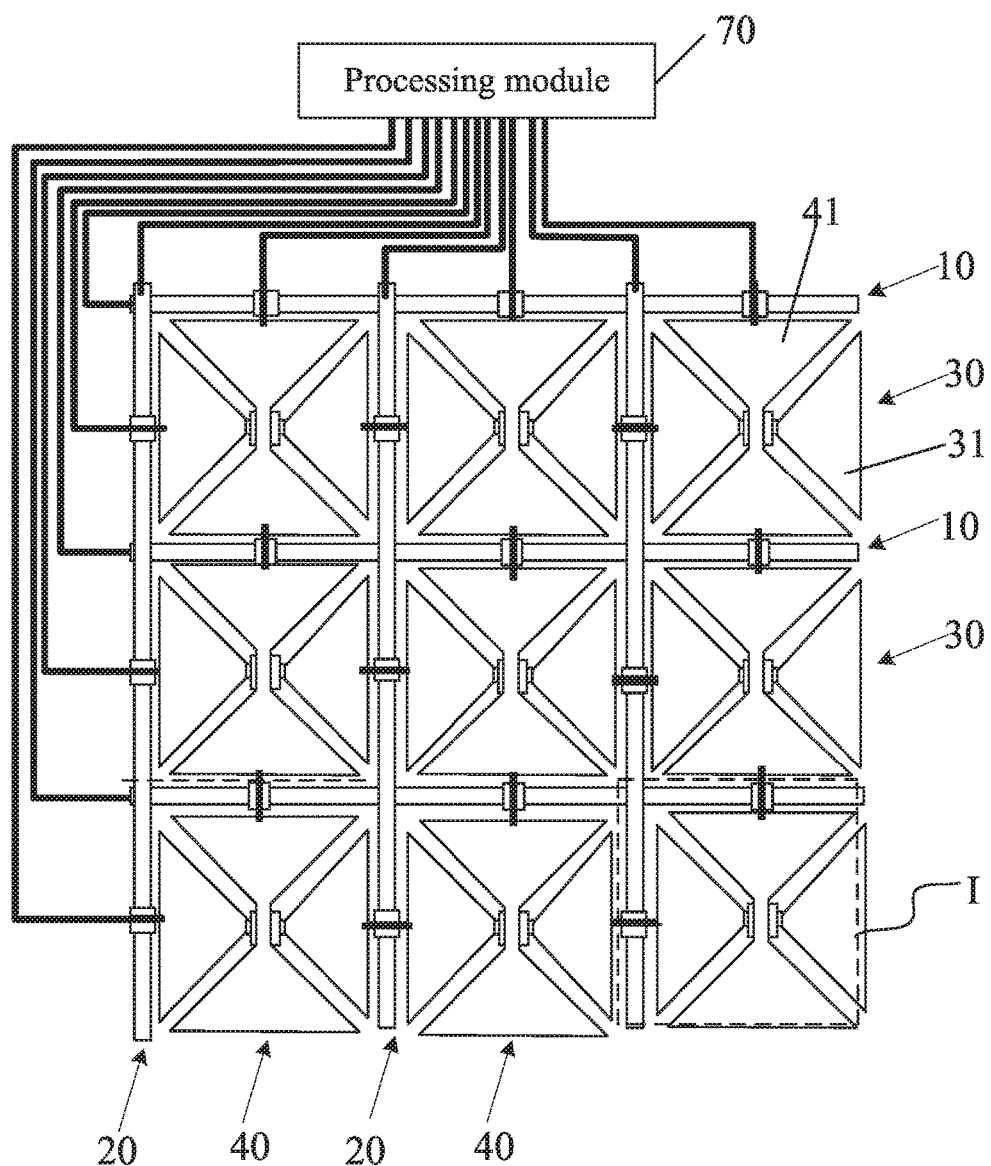
FIG. 1 is a structural diagram of a touch substrate in an embodiment of the present invention.
Figure 2:
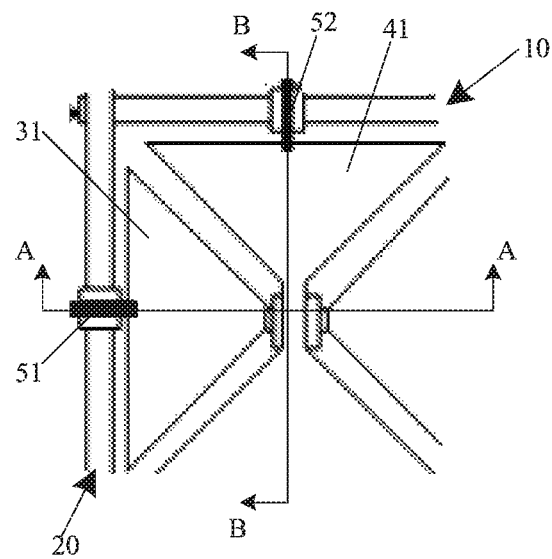
FIG. 2 is an enlarged structural diagram of region I in FIG. 1.

REFERENCE NUMERALS 10, first pressure sensitive electrode; 11, first electrode strip;
12, first pressure sensing strip; 20, second pressure sensitive electrode;
21, second electrode strip; 22, second pressure sensing strip;
30, capacitive touch driving electrode;
31, capacitive touch driving electrode patch;
40, capacitive touch sensing electrode;
41, capacitive touch sensing electrode patch; 51, first bridging element;
52, second bridging element; 53, third bridging element;
60, insulating layer; 70, processing module;
80, transparent protective layer; 90, display substrate; and
91, bonding material.

DESCRIPTION OF THE PREFERRED EMBODIMENT

Specific embodiments of the present invention will be described in detail below in conjunction with the accompanying drawings. It should be understood that, the specific embodiments are merely described herein for illustrating and explaining the present invention but are not intended to limit the present invention.

As an aspect of the present invention, a touch substrate is provided. As shown in FIG. 1, the touch substrate comprises a plurality of capacitive touch driving electrodes 30 extending in a row direction and a plurality of capacitive touch sensing electrodes 40 extending in a column direction, a plurality of first pressure sensitive electrodes 10 extending in the row direction, and a plurality of second pressure sensitive electrodes 20 extending in the column direction. The capacitive touch driving electrode 30 and the capacitive touch sensing electrode 40 are insulated and spaced from each other, the first pressure sensitive electrode 10 is insulated and spaced from the capacitive touch driving electrode 30 and the capacitive touch sensing electrode 40, and the second pressure sensitive electrode 20 is insulated and spaced from the capacitive touch driving electrode 30 and the capacitive touch sensing electrode 40. When the touch substrate is touched, a voltage corresponding to a pressure at a touch position can be generated between the first pressure sensitive electrode 10 and the second pressure sensitive electrode 20 corresponding to the touch position.

The touch position is determined accurately in accordance with change of a sensing capacitance formed between the capacitive touch sensing electrode and the capacitive touch driving electrode, meanwhile, a voltage corresponding to the pressure at the touch position is generated between the first pressure sensitive electrode 10 and the second pressure sensitive electrode 20 corresponding to the touch position, so that pressure sensing is realized while ensuring touch sensitive. Thus, with the touch display panel or touch display device comprising the touch substrate, different operations can be performed in accordance with different voltages (i.e., different pressures), resulting in enhanced user's experiences.

Specifically, at least one capacitive touch driving electrode 30 is provided between any two adjacent first pressure sensitive electrodes 10, and at least one capacitive touch sensing electrode 40 is provided between any two adjacent second pressure sensitive electrodes 20. That is to say, the first pressure sensitive electrode 10 is provided between two adjacent capacitive touch driving electrodes 30, the second pressure sensitive electrode 20 is provided between two adjacent capacitive touch sensing electrodes 40. Thus, a vacant area between two adjacent capacitive touch sensing electrode 40 and a vacant area between two adjacent capacitive touch driving electrodes 30 are fully utilized, and an influence, on thickness of the touch substrate, caused by providing the first pressure sensitive electrode 10 and the second pressure sensitive electrode 20 is avoided.

In order to realize pressure sensing every time when the touch substrate is touched, the first pressure sensitive electrode 10 and the second pressure sensitive electrode 20 should be provided to satisfy: when the touch substrate is touched, the touch area covers at least one intersection point of the first pressure sensitive electrode 10 and the second pressure sensitive electrode 20. Preferably, as shown in FIG. 1, the first pressure sensitive electrode 10 and the capacitive touch driving electrode 30 are alternately arranged, and the second pressure sensitive electrode 20 and the capacitive touch sensing electrode 40 are alternately arranged.

Figure 3:
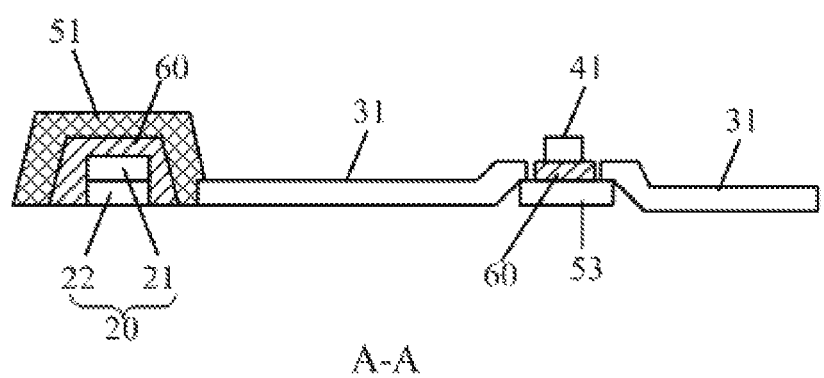
FIG. 3 is a cross-sectional view of a profile taken along line A-A in FIG. 2.
Figure 4:
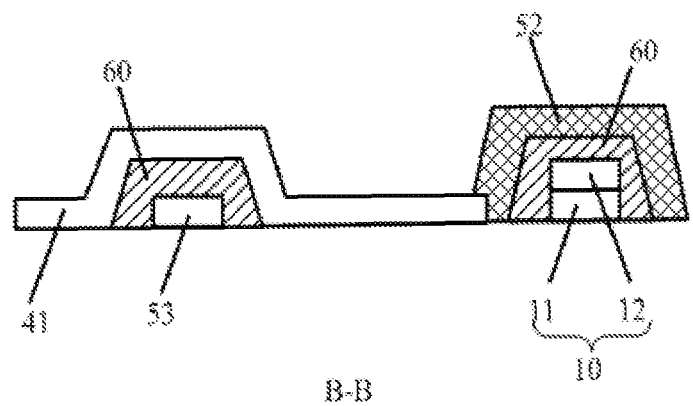
FIG. 4 is a cross-sectional view of a profile taken along line B-B in FIG. 2.

Specifically, as shown in FIGS. 3 and 4, the first pressure sensitive electrode 10 comprises a first electrode strip 11 and a first pressure sensing strip 12, the second pressure sensitive electrode 20 comprises a second electrode strip 21 and a second pressure sensing strip 22, both the first pressure sensing strip 12 and the second pressure sensing strip 22 are formed of a transparent material with piezoelectric effect, and the first pressure sensing strip 12 and the second pressure sensing strip 22 are provided intersecting with each other and in a same layer; and the first electrode strip 11 is provided below the first pressure sensing strip 12, and the second electrode strip 21 is provided above the second pressure sensing strip 22; alternatively, the first electrode strip 11 may be provided above the first pressure sensing strip 12, and the second electrode strip 21 is provided below the second pressure sensing strip 22. The "above", "below" herein are in a direction of thickness of the touch substrate.

The so-called piezoelectric effect refers to that, when some dielectric is deformed by action of an external force in a certain direction, polarization phenomenon occurs therein, at the same time, positive and negative charges appear on two opposite surfaces thereof, and when the external force disappears, the dielectric is restored to uncharged state, this phenomenon is referred to as positive piezoelectric effect. When action direction of the external force is changed, the polarities of the charges are also changed.

Specifically, the first pressure sensing strip 12 and the second pressure sensing strip 22 are formed of a material including polylactic acid piezoelectric material or piezoelectric ceramic material.

When the intersection point of the $M^{th}$ first pressure sensitive electrode 10 and the $N^{th}$ second pressure sensitive electrode 20 is touched, since the first pressure sensing strip 12 and the second pressure sensing strip 22 are connected intersecting with each other, the overlapped portion of the $M^{th}$ first pressure sensing strip 12 and the $N^{th}$ second pressure sensing strip 22 is deformed, thus charges with opposite polarities appear on the $M^{th}$ first electrode strip 11 and the $N^{th}$ second electrode strip 21 respectively, which leads to a voltage being generated between the $M^{th}$ first pressure sensitive electrode 10 and the $N^{th}$ second pressure sensitive electrode 20. The larger the pressure generated by the touch is, the larger the deformation of the first pressure sensing strip 12 and the second pressure sensing strip 22 is, and the more the charges appear on the first electrode strip 11 and the second electrode strip 21, the larger the voltage generated between the first electrode strip 11 and the second electrode strip 21 is. When a voltage generated between the $M^{th}$ first electrode strip 11 and the $N^{th}$ second electrode strip 21 is detected, the intersection point of the $M^{th}$ first pressure sensitive electrode 10 and the $N^{th}$ second pressure sensitive electrode 20 is determined as the touch point, and the pressure by the touch is further determined in accordance with the voltage between the first electrode strip 11 and the second electrode strip 21.

Further, as shown in FIG. 1, the touch substrate further comprises a processing module 70, a first piezoelectric transmission line connected between the first electrode strip 11 and the processing module 70, and a second piezoelectric transmission line connected between the second electrode strip 21 and the processing module 70, wherein the processing module 70 is configured to receive electrical signals from the first electrode strip 11 and the second electrode strip 21, and determine the pressure at the touch position in accordance with the electrical signals from the first electrode strip 11 and the second electrode strip 21.

It should be noted that, when the touch substrate is touched or pressed, portions of the first electrode strip 11 and the second electrode strip 21 corresponding to the touch region are deformed, other portions of the first electrode strip 11 or the second electrode strip 21 not corresponding to the touch region may also be deformed, in this case, the intersection point of the first pressure sensing strip 12 and the second pressure sensing strip 22, which has the largest deformation, is determined as the touch point, that is, the intersection point of the first electrode strip 11 and the second electrode strip 21 capable of generating a maximum voltage therebetween is determined as the touch point, and the pressure at the touch point is determined in accordance with the maximum voltage.

As above, when the overlapped portion of the $M^{th}$ first pressure sensing strip 12 and the $N^{th}$ second pressure sensing strip 22 is deformed, charges with opposite polarities appear on the $M^{th}$ first electrode strip 11 and the $N^{th}$ second electrode strip 21, thus the processing module 70 can detect a voltage between the first electrode strip 11 and the second electrode strip 21 and convert the voltage into a corresponding pressure value, thereby, with the touch display panel or touch display device comprising the touch substrate, different operations can be performed in accordance with different pressures.

Further, the touch substrate further comprises a touch driving transmission line and a touch sensing transmission line, the touch driving transmission line being connected between the capacitive touch driving electrode 30 and the processing module 70, the touch sensing transmission line being connected between the capacitive touch sensing electrode 40 and the processing module 70, wherein the processing module 70 is configured to provide a touch driving signal to the capacitive touch driving electrodes 30 successively, and detecting the voltage sensed by the capacitive touch sensing electrode 40. A touch sensing capacitance is formed at the intersection point of the capacitive touch driving electrode 30 and the capacitive touch sensing electrode 40, and when the capacitive touch driving electrode 30 receives a touch driving signal, a touch sensing voltage is correspondingly generated on the capacitive touch sensing electrode 40. When the touch substrate is touched, phenomenon such as electrode discharging, changing of distance between electrodes, changing of dielectric constant between electrodes may occur at the touch position, resulting in that the sensing capacitance at the touch position is also changed.

Thus, when the capacitive touch driving electrode 30 corresponding to the touch position is scanned, the touch sensing signal on the capacitive touch sensing electrode 40 corresponding to the touch position is also changed, thereby coordinates of the touch position can be determined.

Usually, when a user touches the touch substrate by a finger, the touch area is not very small so that multiple sensing capacitances are changed, at this time, a touch range may be determined in accordance with positions of the multiple sensing capacitances, and the central point of the touch range is determined as the final touch position.

Specifically, referring to FIGS. 1 through 4, each of the capacitive touch sensing electrodes 40 comprises a plurality of capacitive touch sensing electrode patches 41 connected with each other successively, and each of the capacitive touch driving electrodes 30 comprises a plurality of capacitive touch driving electrode patches 31 connected with each other successively. Two capacitive touch driving electrode patches 31 of the same capacitive touch driving electrode 30 on both sides of the same second pressure sensitive electrode 20 are bridged by a first bridging element 51, and the first bridging element 51 is insulated and spaced from the second pressure sensitive electrode 20 by the insulation layer 60; and two capacitive touch sensing electrode patches 41 of the same capacitive touch sensing electrode 40 on both sides of the same first pressure sensitive electrode 10 are bridged by a second bridging element 52, and the second bridging element 52 is insulated and spaced from the first pressure sensitive electrode 10 by the insulation layer 60. With such a configuration, the second pressure sensitive electrode 20 is insulated from the capacitive touch driving electrode 30, such that an influence of the touch driving signal on charges on the second electrode strip 21 is avoided, and the first pressure sensitive electrode 10 is insulated from the capacitive touch sensing electrode 40, such that the voltage sensed by the capacitive touch sensing electrode 40 is prevented from being affected by charges on the first electrode strip 11, thus accurate determinations of the touch position and the touch pressure are ensured.

As above, the first pressure sensitive electrode 10 may comprise the first electrode strip 11 and the first pressure sensing strip 12, and the second pressure sensitive electrode 20 may comprise the second electrode strip 21 and the second pressure sensing strip 22. Thus, "the first bridging element 51 is insulated and spaced from the second pressure sensitive electrode 20" refers to that, the first bridging element 51 is insulated and spaced from the second electrode strip 21 and the second pressure sensing strip 22; and "the second bridging element 52 is insulated and spaced from the first pressure sensitive electrode 10" refers to that, the second bridging element 52 is insulated and spaced from the first electrode strip 11 and the first pressure sensing strip 12.

It should be noted that, the touch position may be determined in accordance with the voltage between the first pressure sensing strip 12 and the second pressure sensing strip 22, and also may be determined in accordance with the sensing capacitance between the capacitive touch driving electrode 30 and the capacitive touch sensing electrode 40, the distance between these two touch positions is very small, thus, the midpoint of these two touch positions may be determined as the final touch position.

In the present invention, a region defined by any two adjacent first pressure sensitive electrodes 10 and any two adjacent second pressure sensitive electrodes 20 is provided with two capacitive touch driving electrode patches 31 and two capacitive touch sensing electrode patches 41 therein.

As shown in FIGS. 3 and 4, the two capacitive touch sensing electrode patches 41 are integrally formed, the two capacitive touch driving electrode patches 31 are bridged by a third bridging element 53, and the third bridging element 53 is insulated and spaced from the capacitive touch sensing electrode patches 41 by the insulation layer 60. Alternatively, the two capacitive touch driving electrode patches 31 are integrally formed, and the two capacitive touch sensing electrode patches 41 are bridged by a third bridging element 53 insulated and spaced from the capacitive touch driving electrode patches 31.

The first bridging element, the second bridging element, the first piezoelectric transmission line, the second piezoelectric transmission line, the touch driving transmission line and the touch sensing transmission line may be formed of a same material, so that they may be prepared by a single patterning process, thereby the preparing process is simplified.

Further, the capacitive touch driving electrode patches 31, the capacitive touch sensing electrode patches 41 and the first electrode strip 11 are formed of a same material, the third bridging element 53 and the second electrode strip 21 are formed of a same material, in this case, during manufacturing of the touch substrate, the capacitive touch driving electrode patches 31, the capacitive touch sensing electrode patches 41 and the first electrode strip 11 may be formed simultaneously by a single patterning process, and the third bridging element 53 and the second electrode strip 21 may be formed simultaneously by a single patterning process; or, the capacitive touch driving electrode patches 31, the capacitive touch sensing electrode patches 41 and the second electrode strip 21 are formed of a same material, the third bridging element 53 and the first electrode strip 11 are formed of a same material, in this case, the capacitive touch driving electrode patches 31, the capacitive touch sensing electrode patches 41 and the second electrode strip 21 may be formed simultaneously by a single patterning process, and the third bridging element 53 and the first electrode strip 11 may be formed simultaneously by a single patterning process, thereby the manufacturing process is simplified.

Material of capacitive touch driving electrode patches 31 includes any of indium tin oxide, indium zinc oxide, indium gallium tin oxide, indium gallium zinc oxide and other transparent conductive materials, and material of capacitive touch sensing electrode patches 41 includes any of indium tin oxide, indium zinc oxide, indium gallium tin oxide, indium gallium zinc oxide and other transparent conductive materials.

Figure 5:
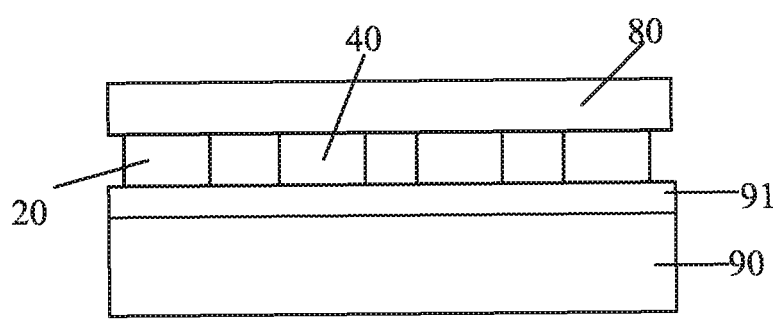
FIG. 5 is a structural diagram of a touch display panel in an embodiment of the present invention.

Further, the touch substrate further comprises a transparent protective layer 80 covering the capacitive touch sensing electrode 40, the capacitive touch driving electrode 30, the first pressure sensitive electrode 10 and the second pressure sensitive electrode 20, as shown in FIG. 5. The transparent protective layer 80 may be formed of glass or an organic transparent material to protect the capacitive touch sensing electrode 40, the capacitive touch driving electrode 30, the first pressure sensitive electrode 10 and the second pressure sensitive electrode 20.

As a second aspect of the present invention, a touch display panel is provided. As shown in FIG. 5, the touch display panel comprises a display substrate 90 and the above touch substrate of the present invention, the display substrate 90 and the touch substrate are connected fixedly. The display substrate may be a liquid crystal cell formed by assembling an array substrate and a color filter substrate, or may be an organic light emitting display substrate.

As shown in FIG. 5, a bonding material 91 is provided between the display substrate 90 and the touch substrate, so that the display substrate 90 and the touch substrate are fixedly bonded as an integrated structure.

As a third aspect of the present invention, a touch display device comprising the touch display panel of the present invention is provided.

Since the touch display panel of the present invention can realize pressure sensing, a control unit of the touch display device can perform different operations in accordance with the touch pressures, resulting in enhanced user's experiences.

As a fourth aspect of the present invention, a driving method of the above touch display panel is provided, and the driving method comprises steps of:

providing a touch driving signal to the capacitive touch driving electrode;

detecting a touch sensing signal from the capacitive touch sensing electrode, and determining a touch position in accordance with the touch sensing signal; and detecting a voltage between the first pressure sensitive electrode and the second pressure sensitive electrode, and determining a pressure at the touch position in accordance with the detected voltage.

A touch sensing capacitance is formed at the intersection point of the capacitive touch driving electrode and the capacitive touch sensing electrode, and when the capacitive touch driving electrode receives a touch driving signal, a touch sensing voltage is correspondingly generated on the capacitive touch sensing electrode. When the touch substrate is touched, the sensing capacitance at the touch position is changed, thus when the capacitive touch driving electrode corresponding to the touch position is scanned, the touch sensing signal on the capacitive touch sensing electrode corresponding to the touch position is different from the touch sensing signals at other positions, thereby coordinates of the touch position can be determined.

When the touch display panel is touched, a voltage is generated between the first pressure sensitive electrode and the second pressure sensitive electrode corresponding to the touch position, the larger the pressure is, the larger the generated voltage is, thus, when a voltage generated between the first pressure sensitive electrode and the second pressure sensitive electrode is detected, the pressure at the touch position may be determined in accordance with the detected voltage.

It could be understood that the above embodiments are merely exemplary embodiments adopted for describing the principle of the present invention, but the present invention is not limited thereto. Various variations and improvements may be made for those with ordinary skill in the art without departing from the spirit and essence of the present invention, and these variations and improvements shall also be encompassed within the protection scope of the present invention.

The invention claimed is:

1. A touch substrate, comprising a plurality of capacitive touch driving electrodes extending in a row direction and a plurality of capacitive touch sensing electrodes extending in a column direction, the capacitive touch driving electrodes and the capacitive touch sensing electrodes being insulated and spaced from each other, wherein the touch substrate further comprises a plurality of first pressure sensitive electrodes extending in the row direction and a plurality of second pressure sensitive electrodes extending in the column direction, the first pressure sensitive electrodes being insulated and spaced from the capacitive touch sensing electrodes and the capacitive touch driving electrodes, the second pressure sensitive electrodes being insulated and spaced from the capacitive touch sensing electrodes and the capacitive touch driving electrodes, and when the touch substrate is touched, a voltage corresponding to a pressure at a touch position is generated between the first pressure sensitive electrode and the second pressure sensitive electrode corresponding to the touch position, wherein at least one capacitive touch driving electrode is provided between any two adjacent first pressure sensitive electrodes, and at least one capacitive touch sensing electrode is provided between any two adjacent second pressure sensitive electrodes, wherein each of the capacitive touch sensing electrodes comprises a plurality of capacitive touch sensing electrode patches connected with each other successively, and each of the capacitive touch driving electrodes comprises a plurality of capacitive touch driving electrode patches connected with each other successively, and two capacitive touch driving electrode patches of the same capacitive touch driving electrode on both sides of the same second pressure sensitive electrode are bridged by a first bridging element, and the first bridging element is insulated and spaced from the second pressure sensitive electrode; and two capacitive touch sensing electrode patches of the same capacitive touch sensing electrode on both sides of the same first pressure sensitive electrode are bridged by a second bridging element, and the second bridging element is insulated and spaced from the first pressure sensitive electrode.

2. The touch substrate of claim 1, wherein the first pressure sensitive electrode and the capacitive touch driving electrode are alternately arranged, and the second pressure sensitive electrode and the capacitive touch sensing electrode are alternately arranged.

3. The touch substrate of claim 2, wherein the first pressure sensitive electrode comprises a first electrode strip and a first pressure sensing strip, the second pressure sensitive electrode comprises a second electrode strip and a second pressure sensing strip, both the first pressure sensing strip and the second pressure sensing strip are formed of a transparent material with piezoelectric effect, and the first pressure sensing strip and the second pressure sensing strip are provided intersecting with each other and in a same layer; and the first electrode strip is provided above the first pressure sensing strip, and the second electrode strip is provided below the second pressure sensing strip; or, the first electrode strip is provided below the first pressure sensing strip, and the second electrode strip is provided above the second pressure sensing strip.

4. The touch substrate of claim 3, further comprises a processing module, a first piezoelectric transmission line and a second piezoelectric transmission line, the first piezoelectric transmission line being connected between the first electrode strip and the processing module, the second piezoelectric transmission line being connected between the second electrode strip and the processing module, wherein the processing module is configured to receive electrical signals from the first electrode strip and the second electrode strip, and determine the pressure at the touch position in accordance with the electrical signals from the first electrode strip and the second electrode strip.

5. The touch substrate of claim 4, further comprises a touch driving transmission line and a touch sensing transmission line, the touch driving transmission line being connected between the capacitive touch driving electrode and the processing module, the touch sensing transmission line being connected between the capacitive touch sensing electrode and the processing module, wherein the processing module is capable of providing a touch driving signal to the capacitive touch driving electrodes successively, and detecting an electrical signal sensed by the capacitive touch sensing electrode.

6. The touch substrate of claim 2, further comprises a transparent protective layer covering the capacitive touch sensing electrode, the capacitive touch driving electrode, the first pressure sensitive electrode and the second pressure sensitive electrode.

7. The touch substrate of claim 3, wherein the first pressure sensing strip and the second pressure sensing strip are formed of a material including polylactic acid piezoelectric material or piezoelectric ceramic material.

8. The touch substrate of claim 1, wherein the first pressure sensitive electrode comprises a first electrode strip and a first pressure sensing strip, the second pressure sensitive electrode comprises a second electrode strip and a second pressure sensing strip, both the first pressure sensing strip and the second pressure sensing strip are formed of a transparent material with piezoelectric effect, and the first pressure sensing strip and the second pressure sensing strip are provided intersecting with each other and in a same layer; and
the first electrode strip is provided above the first pressure sensing strip, and the second electrode strip is provided below the second pressure sensing strip; or, the first electrode strip is provided below the first pressure sensing strip, and the second electrode strip is provided above the second pressure sensing strip.

9. The touch substrate of claim 8, further comprises a processing module, a first piezoelectric transmission line and a second piezoelectric transmission line, the first piezoelectric transmission line being connected between the first electrode strip and the processing module, the second piezoelectric transmission line being connected between the second electrode strip and the processing module, wherein the processing module is configured to receive electrical signals from the first electrode strip and the second electrode strip, and determine the pressure at the touch position in accordance with the electrical signals from the first electrode strip and the second electrode strip.

10. The touch substrate of claim 9, further comprises a touch driving transmission line and a touch sensing transmission line, the touch driving transmission line being connected between the capacitive touch driving electrode and the processing module, the touch sensing transmission line being connected between the capacitive touch sensing electrode and the processing module, wherein the processing module is capable of providing a touch driving signal to the capacitive touch driving electrodes successively, and detecting an electrical signal sensed by the capacitive touch sensing electrode.

11. The touch substrate of claim 8, wherein the first pressure sensing strip and the second pressure sensing strip are formed of a material including polylactic acid piezoelectric material or piezoelectric ceramic material.

12. The touch substrate of claim 1, further comprises a processing module, a touch driving transmission line and a touch sensing transmission line, the touch driving transmission line being connected between the capacitive touch driving electrode and the processing module, the touch sensing transmission line being connected between the capacitive touch sensing electrode and the processing module, wherein the processing module is capable of providing a touch driving signal to the capacitive touch driving electrodes successively, and detecting an electrical signal sensed by the capacitive touch sensing electrode.

13. The touch substrate of claim 1, wherein a region defined by any two adjacent first pressure sensitive electrodes and any two adjacent second pressure sensitive electrodes is provided with two capacitive touch driving electrode patches and two capacitive touch sensing electrode patches therein, and
the two capacitive touch sensing electrode patches are integrally formed, and the two capacitive touch driving electrode patches are bridged by a third bridging element insulated and spaced from the capacitive touch sensing electrode patches; or, the two capacitive touch driving electrode patches are integrally formed, and the two capacitive touch sensing electrode patches are bridged by a third bridging element insulated and spaced from the capacitive touch driving electrode patches.

14. The touch substrate of claim 13, wherein the first pressure sensitive electrode comprises a first electrode strip and a first pressure sensing strip, the second pressure sensitive electrode comprises a second electrode strip and a second pressure sensing strip, and wherein, the capacitive touch driving electrode patches, the capacitive touch sensing electrode patches and the first electrode strip are formed of a same material, and the third bridging element and the second electrode strip are formed of a same material; or, the capacitive touch driving electrode patches, the capacitive touch sensing electrode patches and the second electrode strip are formed of a same material, and the third bridging element and the first electrode strip are formed of a same material.

15. The touch substrate of claim 1, further comprises a transparent protective layer covering the capacitive touch sensing electrode, the capacitive touch driving electrode, the first pressure sensitive electrode and the second pressure sensitive electrode.

16. A touch display panel, comprising a display substrate and the touch substrate of claim 1, the display substrate and the touch substrate are connected fixedly.

17. A touch display device, comprising the touch display panel of claim 16.

18. A driving method of the touch display panel of claim 16, comprising steps of:
providing a touch driving signal to the capacitive touch driving electrode;
detecting a touch sensing signal from the capacitive touch sensing electrode, and determining a touch position in accordance with the touch sensing signal; and
detecting a voltage between the first pressure sensitive electrode and the second pressure sensitive electrode, and determining a pressure at the touch position in accordance with the detected voltage.

\* \* \* \* \*